(12) United States Patent
Schultheis et al.

(10) Patent No.: US 12,030,570 B2
(45) Date of Patent: Jul. 9, 2024

(54) APPARATUSES AND METHODS FOR ASSISTING IN REMOVING, INSTALLING, TRANSPORTING, AND/OR STORING A DOOR OF A VEHICLE

(71) Applicant: RAE SOLUTIONS LLC, DeMotte, IN (US)

(72) Inventors: John H. Schultheis, DeMotte, IN (US); Alan S. Demske, Wheatfield, IN (US)

(73) Assignee: RAE SOLUTIONS LLC, DeMotte, IN (US)

( * ) Notice: Subject to any disclaimer, the term of this patent is extended or adjusted under 35 U.S.C. 154(b) by 155 days.

(21) Appl. No.: 17/691,580

(22) Filed: Mar. 10, 2022

(65) Prior Publication Data

US 2022/0396323 A1 Dec. 15, 2022

Related U.S. Application Data

(60) Provisional application No. 63/208,593, filed on Jun. 9, 2021.

(51) Int. Cl.
*B62D 65/02* (2006.01)
*B25H 1/00* (2006.01)
*B62D 65/06* (2006.01)

(52) U.S. Cl.
CPC ......... *B62D 65/026* (2013.01); *B25H 1/0042* (2013.01); *B62D 65/06* (2013.01)

(58) Field of Classification Search
CPC ...... B25H 1/0042; B25H 1/16; B25H 1/0007; B62D 65/06; B62D 65/026
See application file for complete search history.

(56) References Cited

U.S. PATENT DOCUMENTS

| | | | | |
|---|---|---|---|---|
| 1,900,528 A | * | 3/1933 | Statz | B66F 5/025 254/7 B |
| 2,264,979 A | | 12/1941 | Jackson | |
| 2,418,443 A | * | 4/1947 | Wiesner | B66F 5/025 254/7 R |
| 2,583,114 A | * | 1/1952 | Monteith | B66F 5/025 414/743 |
| 2,806,613 A | * | 9/1957 | McLvin | B66F 5/025 414/743 |
| 2,938,635 A | | 5/1960 | Dyer | |
| 5,262,706 A | * | 11/1993 | Hollingsworth | B66F 5/025 318/560 |

(Continued)

*Primary Examiner* — Bayan Salone
(74) *Attorney, Agent, or Firm* — Hartman Global IP Law; Gary M. Hartman; Domenica N. S. Hartman

(57) ABSTRACT

A door lift apparatus for removing and/or installing a door of a vehicle by lifting the door from or onto hinges of the vehicle. The door lift apparatus includes a support frame, a cradle for receiving the door, and a displacement device configured to raise and lower the cradle relative to the support frame, and may further include a lateral stabilizer to prevent or limit lateral movement of the cradle relative to the support frame and/or a leveling shim to maintain the door in a substantially level position when supported. A door storage apparatus configured to be used with the door lift apparatus has a hanger arm configured to extend through a window opening of the door and support the door. A door glide slidably mounted on the hanger arm provides a mechanism to move the door axially back and forth along the hanger arm without scratching the door.

15 Claims, 7 Drawing Sheets

(56) References Cited

U.S. PATENT DOCUMENTS

| | | | | |
|---|---|---|---|---|
| 6,050,546 | A * | 4/2000 | Peschmann | B66F 5/025 |
| | | | | 254/7 R |
| 9,327,781 | B2 | 5/2016 | Hopkins | |
| 9,630,819 | B2 * | 4/2017 | Ong | B66F 7/0608 |
| 10,407,087 | B1 * | 9/2019 | Baker | B62B 3/005 |
| 10,973,719 | B2 * | 4/2021 | Stafford | B62B 1/12 |
| 11,014,591 | B2 | 5/2021 | Parrish | |
| 2014/0374680 | A1 * | 12/2014 | Tsang | B62B 3/0612 |
| | | | | 254/7 C |
| 2015/0137055 | A1 * | 5/2015 | Ong | B66F 7/0625 |
| | | | | 254/7 B |
| 2017/0217743 | A1 * | 8/2017 | Mathieson | B60B 29/001 |

* cited by examiner

APPARATUSES AND METHODS FOR ASSISTING IN REMOVING, INSTALLING, TRANSPORTING, AND/OR STORING A DOOR OF A VEHICLE

CROSS-REFERENCE TO RELATED APPLICATIONS

This patent application claims the benefit of Provisional U.S. Patent Application No. 63/208,593, filed Jun. 9, 2021, the entirety of which is incorporated by reference herein.

BACKGROUND OF THE INVENTION

The present invention generally relates to apparatuses, devices, and methods for assisting in removing, installing, transporting, and/or storing a door of a vehicle.

Certain consumer vehicles include doors that are factory designed to be removable. That is, the doors are specifically configured to be decoupled from and coupled to a body of the vehicle repeatedly and relatively easily by the end consumer. With the ability to remove and replace the doors, consumers are able to customize the exterior of the vehicles for specific environments, seasons, activities, or personal preferences.

As a nonlimiting example, certain vehicles commercially available under the brand name Jeep® manufactured by FCA US LLC and/or the Bronco® by Ford Motor Company include doors that are coupled to a body of the vehicle with door hinges specifically configured to allow disassembly of the door from the vehicle. In general, such door hinges may include an assembly of a bracket fixed to the body of the vehicle and a vertical bolt or other type of pin fixed to the door that is received and pivotally secured within the bracket. With designs of this type, the door may be removed from the vehicle by opening the door, removing a nut(s) that secures the bolt within the bracket, disconnecting any electrical wiring (preferably in accordance with manufacturer's instructions), and then lifting the door relative to the body of the vehicle such that the bolt slides up and out of the bracket, thereby releasing the door from the vehicle.

Although improvements have been made over time to these types of vehicles to promote ease of door removal, it may still be difficult for certain consumers to remove and replace the doors. For example, the doors on these types of vehicles commonly weigh between 35 and 95 lbs. (15 to 45 kg) each and may not include handholds designed for lifting and transporting the doors. As such, many consumers may not be physically capable of safely removing or replacing the doors. Although certain existing commercial, automotive lifts (e.g., hoists, cranes) may be used to assist in door removal, if such lifts are not specifically designed for this purpose the removal process may result in damage to the door or vehicle (e.g., scratched paint, dents, etc.).

In view of the above, it can be appreciated that there are certain problems, shortcomings or disadvantages associated with the prior art, and that it would be desirable if devices and methods were available for assisting in removal of vehicle doors that were capable of at least partly overcoming or avoiding the problems, shortcomings or disadvantages noted above.

BRIEF SUMMARY OF THE INVENTION

The present invention provides apparatuses, and methods capable of assisting in removing, installing, transporting, and/or storing a door of a vehicle.

According to one nonlimiting aspect of the invention, a door lift apparatus is provided for assisting in the removal of a door from a vehicle. The door lift apparatus includes a support frame configured to support the door lift apparatus on a surface, a cradle configured to receive and hold at least lower portions of the door over the frame and maintain the door in an upright orientation, a displacement device coupling the support frame to the cradle and configured to raise and lower the cradle relative to the support frame. Transport means are coupled to the support frame for enabling movement of the door lift apparatus across the surface.

According to another nonlimiting aspect of the invention, a door storage apparatus is provided having a mounting frame, hanger arms carried by the mounting frame and extending outwardly from a first side of the mounting frame, and a door glide slidably mounted on the hanger arms and configured to slide axially back and forth along the hanger arms between respective proximal ends and distal ends of the hanger arms.

According to yet another nonlimiting aspect of the invention, a method is provided for removing a door from a vehicle. The method includes opening the door of the vehicle, positioning a door lift apparatus under the door such that at least lower portions of the door are received within and supported by a cradle of the door lift apparatus, raising the cradle relative to a support frame of the door lift apparatus with a displacement device that couples the cradle to the support frame to thereby raise the door relative to a body of the vehicle with the cradle, and continuing to raise the cradle with the displacement device until the door has been sufficiently raised such that the door is decoupled from a door hinge of the vehicle.

One or more technical effects of apparatuses, devices, and methods as described above preferably include the capability of removing, installing, storing, and/or transporting a vehicle door easily and safely.

These and other aspects and advantages of the disclosure will be appreciated from the following detailed description.

DETAILED DESCRIPTION OF THE INVENTION

Figure 1:
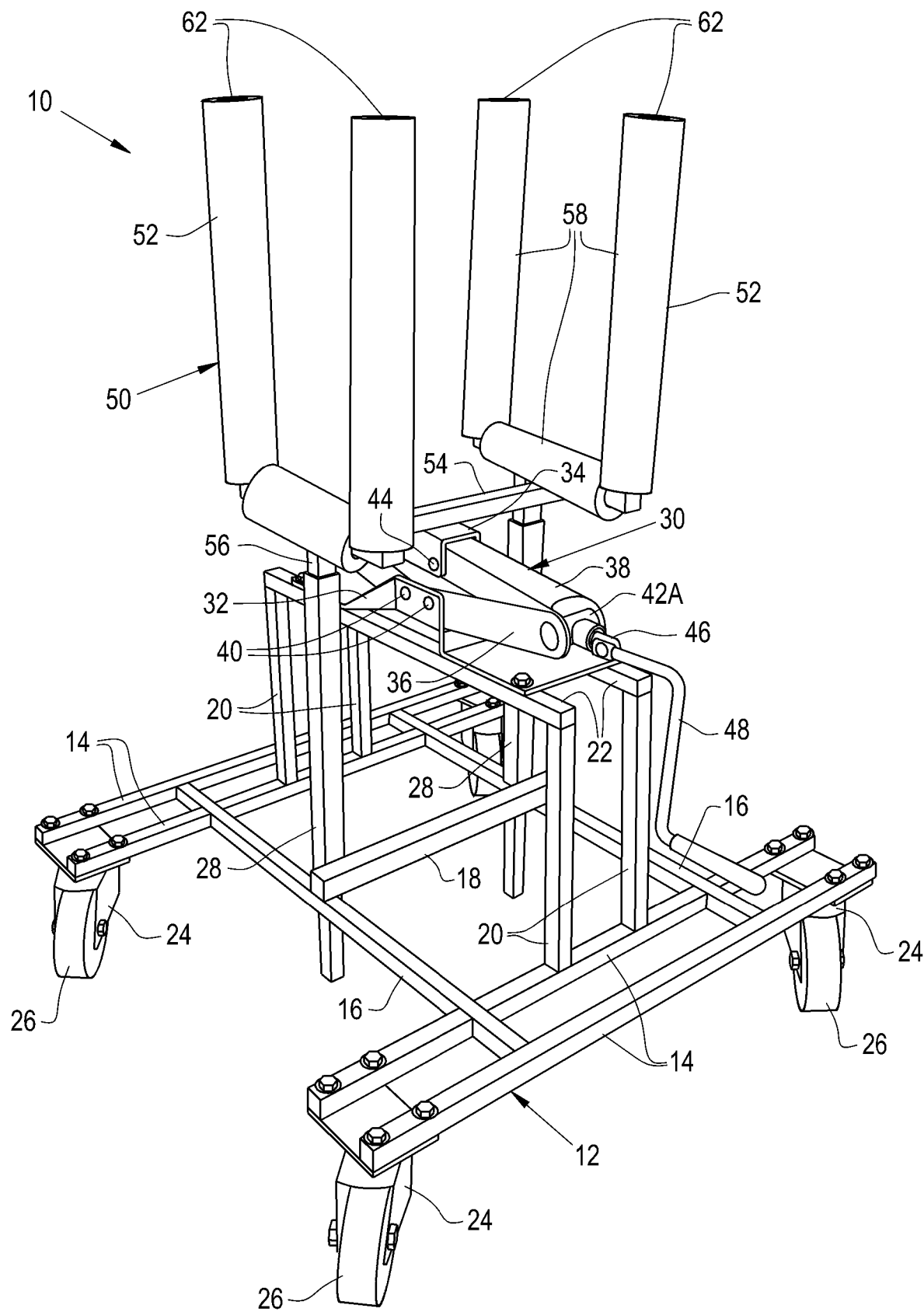
FIG. 1 is a perspective view of a door lift apparatus for assisting in removing, installing, and/or transporting of automotive doors in accordance with certain nonlimiting aspects of the invention, and represents the door lift apparatus with a displacement device in a fully lowered position.

Disclosed herein are apparatuses, devices, and methods for assisting in the removal, installation, transportation, and/or storage of automotive doors, such as those commonly provided with certain vehicles including but not limited to vehicles commercially available under the brand name Jeep® manufactured by FCA US LLC and/or the Bronco® by Ford Motor Company. Such doors may be factory designed to be removed by the end consumer, for example, by lifting the door upwards to decouple the door from a door hinge. The apparatuses, devices, and methods are preferably capable of promoting the ease of door removal and installation, reducing time necessary for door removal and installation, and promoting user safety during removal, installation, and transportation of doors. The apparatuses, devices, and methods may be particularly beneficial for consumers who may not have access to commercial, automotive lifts (e.g., hoists, cranes). The apparatuses, devices, and methods may in some embodiments also be capable of use to remove, lift, and/or carry doors from other types of vehicles.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings, including the embodiment(s) depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded as the invention, including certain but not necessarily all of the aspects and alternatives described in the detailed description.

To facilitate the description provided below of the embodiments represented in the drawings, relative terms, including but not limited to, "vertical," "horizontal," "lateral," "front," "rear," "side," "forward," "rearward," "upper," "lower," "above," "below," "right," "left," etc., may be used in reference to an orientation of the apparatuses and devices during their operations, and therefore are relative terms that indicate the construction, installation and use of the apparatuses and devices but should not be necessarily interpreted as limiting the scope of the invention.

Figure 2:
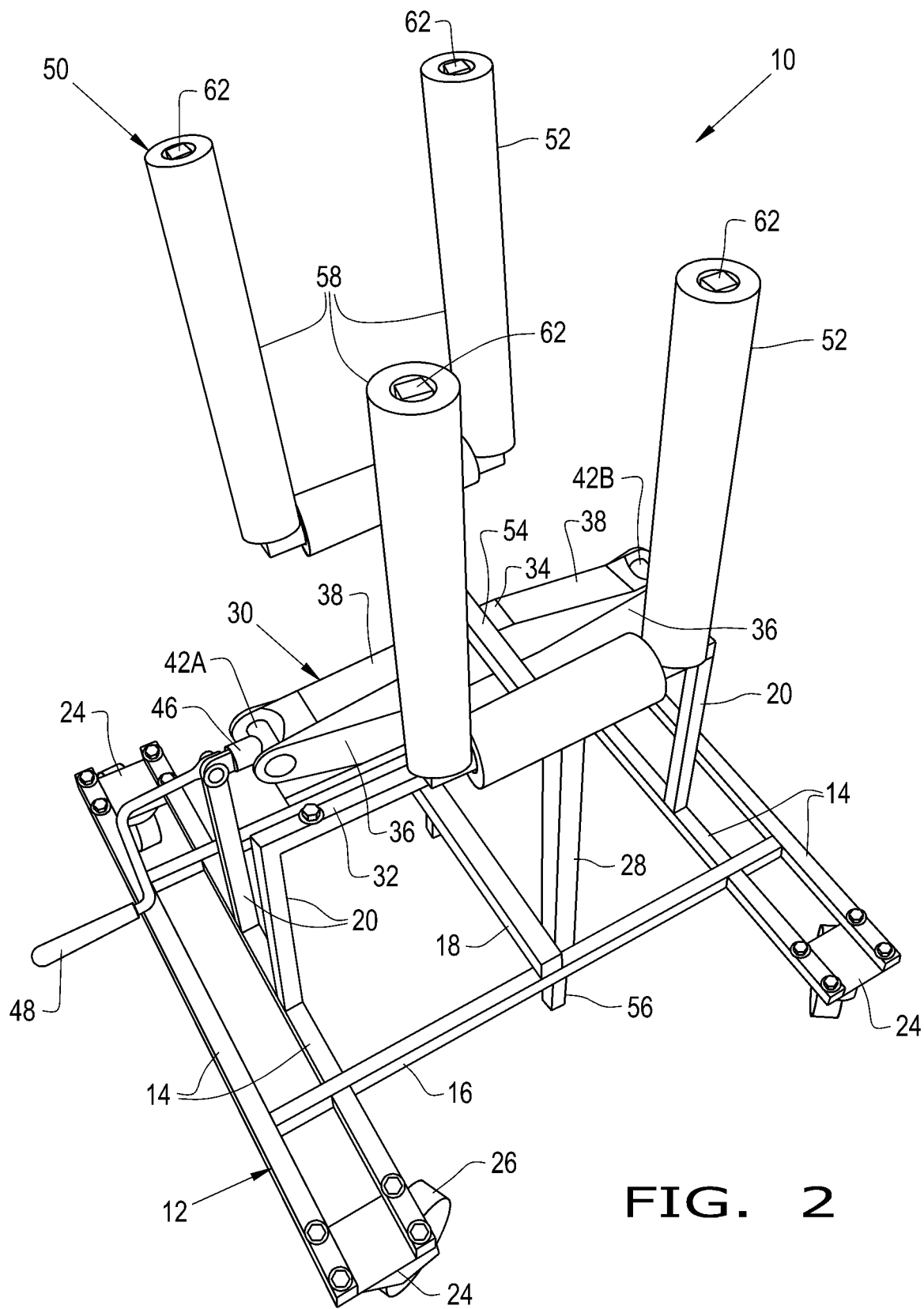
FIG. 2 is another perspective view of the door lift apparatus of FIG. 1.
Figure 3:
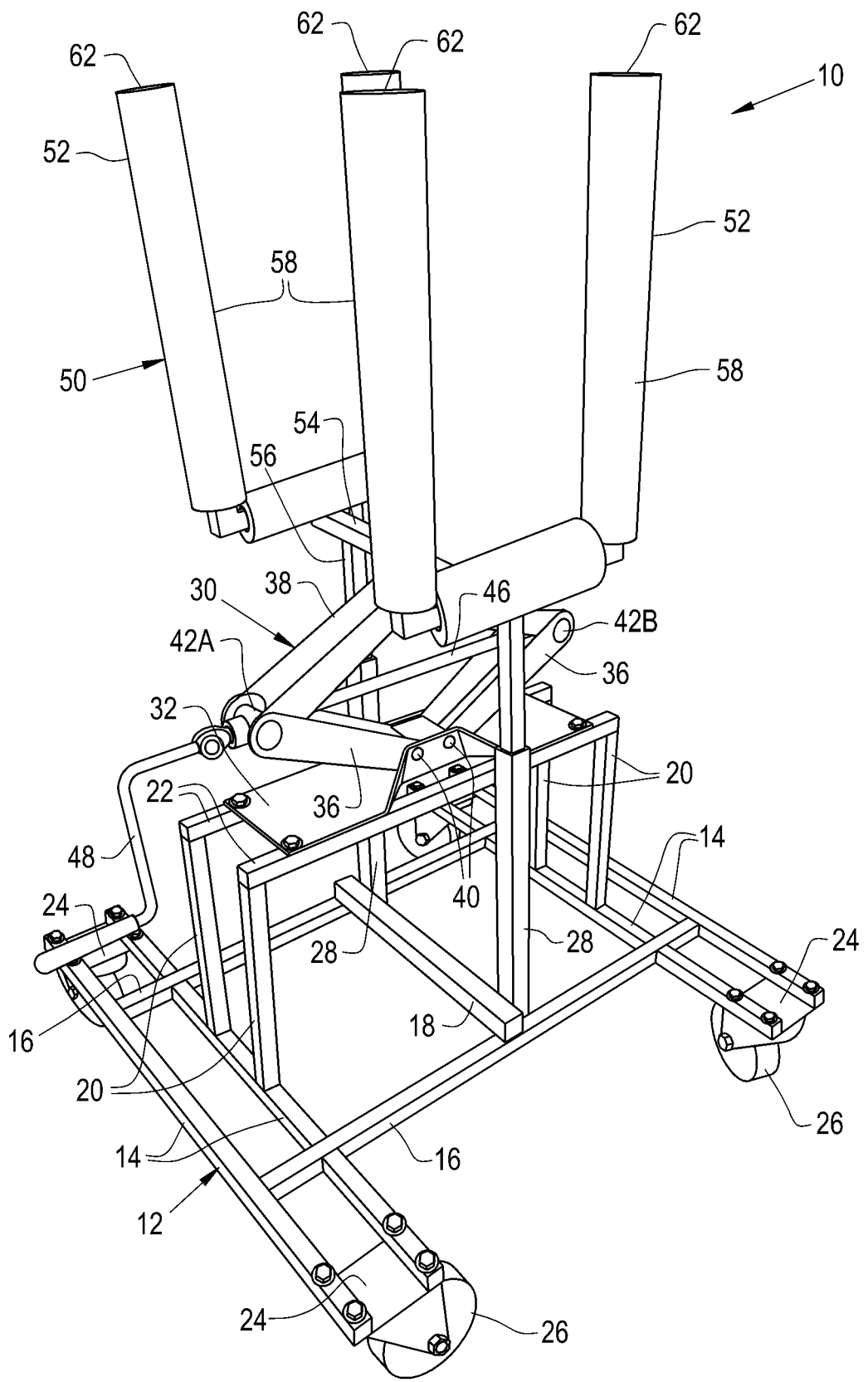
FIG. 3 is a perspective view of the door lift apparatus of FIG. 1 with the displacement device in a partially raised position.
Figure 4:
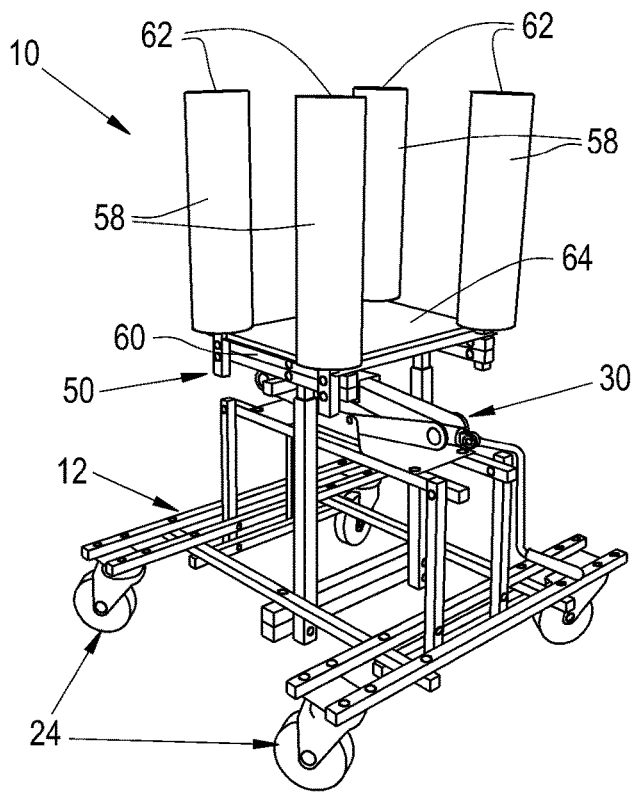
FIG. 4 is a perspective view of a door lift apparatus according to another nonlimiting embodiment with a displacement device thereof in a fully lowered position.

FIGS. 1 through 3 represent a nonlimiting example of a door lift apparatus 10 configured for assisting in the removal, installation, and transportation of a vehicle door (for example, such as a door 200 depicted in FIGS. 10 and 11) having features encompassing those described above. As such, it should be understood that, though referred to as a door lift apparatus, the door lift apparatus 10 represented in the drawings is not limited to operations involving lifting of a door. The door lift apparatus 10 is represented as including a support frame 12 configured to support the apparatus 10 on a support surface (e.g., the ground or a floor), a cradle 50 configured to receive and hold a vehicle door, and a displacement device 30 coupling the support frame 12 to the cradle 50 and configured to displace, in particular, at least raise and lower, the cradle 50 relative to the support frame 12.

In the nonlimiting embodiment shown, the support frame 12 has a base having two spaced apart pairs of primary base members 14 and two secondary base members 16 connecting the pairs of primary base members 14. Four support members 20 are coupled to respective ones of the primary base members 14 and extend upward from the base. A pair of elevated members 22 span between and connect oppositely-disposed pairs of the support members 20. A pair of frame guide members 28 are connected to corresponding ones of the secondary base members 16 and extend upward from the base. A cross brace member 18 spans between and connects the secondary base members 16 and is further connected to sides of the frame guide members 28 to provide additional support thereof.

To promote movement of the door lift apparatus 10, transport means or devices, represented in the drawings as wheel assemblies 24, are coupled adjacent distal ends of the primary base members 14. Though the wheel assemblies 24 are an example of a convenient means for transporting the apparatus 10 across a surface, other transport means are also within the scope of the invention, including but not limited to tracks, sleds, rollers, etc. One or more of the wheel assemblies 24 may include swivel casters, including a wheel 26 rotatably coupled to a fork or bracket such that they may rotate about an axis generally parallel to the base of the support frame 12. Each such caster preferably includes a swivel joint to promote alignment of the wheel 26 to a direction of travel during movement of the apparatus 10. Optionally, one or more of the wheels assemblies 24 may include a locking mechanism (not shown) configured to releasably lock its wheel 26 and prevent rotation thereof relative to the fork. As a nonlimiting example, each of two of the wheel assemblies 24 may be a locking swivel caster for the purpose of improving control and/or safety.

The displacement device 30 is configured to displace, in particular, at least raise and lower, the cradle 50, preferably at least along a substantially straight vertical axis relative to the support frame 12 so as to not have any or at least limited lateral movement of the door relative to the vehicle while raising or lowering the door. In this nonlimiting embodiment, the displacement device 30 has a structure and function generally similar to a conventional mechanical scissor jack. The displacement device 30 is represented as including a foot 32 coupled to the elevated members 22 and thereby coupled to the support frame 12, and a top bracket 34 coupled to a cradle beam 54 and thereby coupled to the cradle 50. A lifting assembly of the displacement device 30 functionally couples the foot 32 and the top bracket 34 and is configured to displace, in particular, at least raise and lower, the top bracket 34 and the cradle 50 thereon relative to the foot 32 and the support frame 12 therebelow.

The lifting assembly of the displacement device 30 is represented as including a pair of lower arms 36 coupled to the foot 32 via corresponding lower pins 40, a pair of upper arms 38 coupled to the top bracket 34 via corresponding upper pins 44, and each of the lower arms 36 are coupled to a corresponding one of the upper arms 38 via corresponding side pins 42 (referred to herein as a proximal side pin 42A and a distal side pin 42B). A screw (threaded rod) 46 is coupled to and passes through the proximal side pin 42A, spans between the pairs of lower arms 36 and upper arms 38, and passes through and is threadedly coupled to the distal side pin 42B. The screw 46 is coupled with a handle (hand crank) 48 adjacent to the proximal side pin 42A that is configured to promote ease of manually rotating the screw 46.

Rotation of the screw 36 causes the distal side pin 42B to threadedly slide along the screw 46 in longitudinal directions thereof, either toward or away from the proximal side pin 42A depending on the direction of rotation of the screw 36. As the distal side pin 42B moves along the screw 46 toward or away from the proximal side pin 42A, the distance therebetween is reduced or increased, respectively, which causes the lower arms 36 and the upper arms 38 to pivot about their respective lower pins 40, side pins 42, and upper pins 44 and thereby transition between a collapsed configuration (FIGS. 1 and 2) and an expanded configuration (FIG. 3). Transitioning the lifting assembly toward the collapsed configuration lowers the cradle 50 relative to the support frame 12 (that is, decreases a vertical distance therebetween), and transitioning toward the expanded configuration raises the cradle 50 relative to the support frame 12 (that is, increases the vertical distance therebetween).

The cradle 50 is configured to support and maintain the door in an upright (generally vertical) orientation. In FIGS. 1 through 3, the cradle 50 is represented as including a pair of cradle sections 52 that have a generally U-shaped or open rectangle shaped body configured to receive and support at least lower portions of a vehicle door. Each cradle section 52 is represented as including a bottom member connected at ends thereof to a pair of arms 62 that extend upward away from the base of the support frame 12 at opposite ends of the bottom member. Each cradle section 52 is represented as including an opening between distal ends of the arms 62. Each pair of arms 62 on each cradle section 52 is spaced apart a distance sufficient to receive the thickness of a door therebetween with the exterior side of the door facing one of the arms 62 and the interior side of the door facing the other of the arms 62. Preferably, the distance between the arms is also selected small enough to prevent the door from tipping over, that is, the distance is only slightly larger than the width of the door. For example, in certain embodiments, the arms 62 on the cradle section 52 are spaced apart approximately 12 inches (30 cm); however other distances may be used. In addition, the arms 62 preferably have a height or axial length extending above the respective bottom member to laterally support the door in a substantially vertical orientation and prevent the door from tipping over. As a nonlimiting example, each arm 62 may be a ¾ inch (1.9 cm) square tubular section and approximately 15 inches (48 cm) long, although other sizes and shapes are possible. The bottom members are connected at spaced apart locations on the cradle beam 54 that spans therebetween. The cradle sections 52 are aligned along an axis such that the cradle 50 may be disposed under and support a central portion of the bottom of the door with the cradle sections 52 spaced inwardly from the respective opposite front and back ends of the door. In other words, the length of the door extends through both of the U-shaped cradle members between each pair of arms 62. This allows door to be centered on the cradle 50 and/or the cradle 50 to be centered under the door between the front and back ends of the door so that the weight of the door is generally balanced on the cradle 50 between the front and back ends of the door so as to minimize any front to back rotational forces on the cradle 50 and the door.

Figure 5:
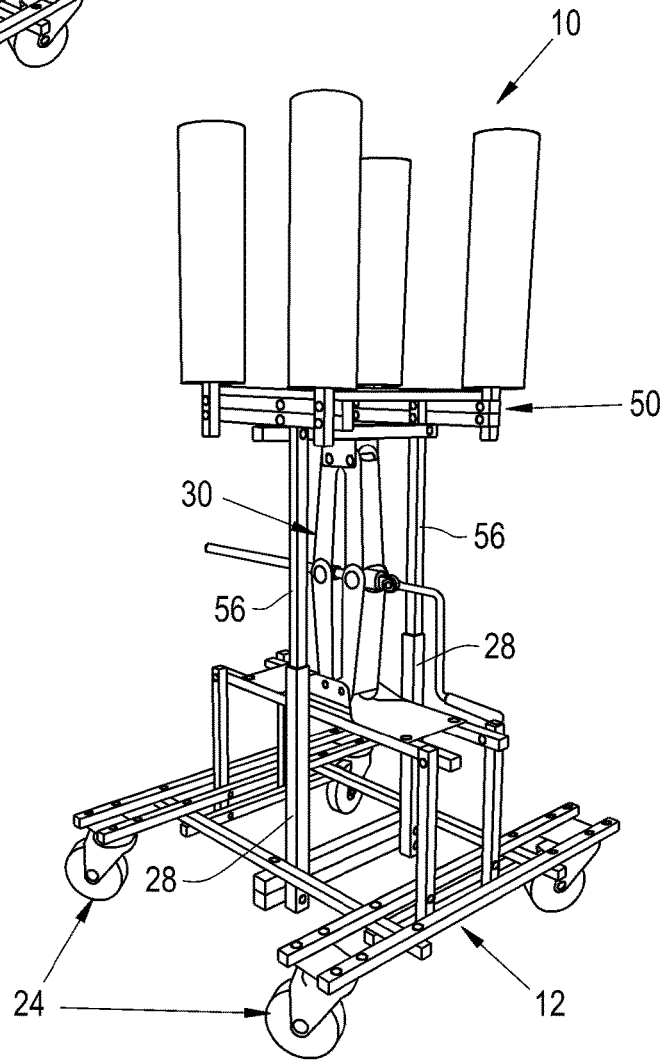
FIG. 5 is a perspective view of the door lift apparatus of FIG. 4 with the displacement device in a fully raised position.

A lateral load stabilizing system having one or more lateral stabilizers is provided to help balance the load of the door when carried in the cradle 50. In the present example, the load stabilizing system is in the form of twin lateral load stabilizers having two lateral stabilizers, although lateral load stabilizing system have a single lateral stabilizer is also possible. In the present example, the twin lateral load stabilizing system is represented as including a pair of cradle guide members 56 that are coupled to the cradle beam 54 on opposite sides of the displacement device 30 and configured to travel up and down along respective ones of the frame guide members 28 so as to prevent or at least limit lateral movement of the cradle 50 relative to the base. In FIG. 5, the cradle guide members 56 are received within interior cavities of the respective ones of the frame guide members 28. As the cradle 50 is raised or lowered with the displacement device 30, the cradle guide members 56 slide upwards or downwards, respectively, within their corresponding frame guide members 28. The frame guide members 28 act as lateral barriers against sides of the cradle guide members 56 to provide lateral support for the cradle 50. Each inter-engaging pair of a frame guide member 28 and a cradle guide member 56 forms a single lateral stabilizer. As a nonlimiting example, the cradle guide members 56 may be ¾ inch (2 cm) square tubes that fit inside of 1 inch (2.5 cm) tube frame guide members 28. The cradle guide members 56 and the frame guide members 28 each have a height selected to allow for maximum lift of the displacement device 30 and cradle 50 and still keep a minimum length of the cradle guide members 56 disposed inside the frame guide members 28 at the maximum travel of the displacement device 30. This may provide improved usability, for example when the door lift apparatus 10 is used to remove the doors from a lifted vehicle. The sliding lateral engagement between the cradle guide members 56 disposed inside the frame guide members 28 limits side-to-side movement of the cradle 50 relative to the support frame 12, which may be particularly advantageous when the displacement device 30 elevates the cradle 50 with a door carried therein to reduce the possibility of the cradle 50 and door from placing undesired stress on the connection between the cradle 50 and the displacement device 30 and/or tipping over sideways. This twin lateral load stabilizing system also may minimize side-to-side movement and/or manipulation when re-installing a door to the vehicle frame.

The cradle sections 52 may include padding 58, such as foam tubes or coverings, covering the arms 62 and/or the bottom member to reduce a likelihood of scratching or damaging the vehicle doors when supported by the cradle sections 52. The padding 58 may be permanently attached to or removably disposed on the arms 62 and/or the bottom member of the cradle member.

The door lift apparatus 10 is, in certain nonlimiting embodiments, particularly adapted for removing, installing, and transporting a door that is coupled to a body of a vehicle with a hinge assembly that includes a bracket fixed to the body of the vehicle and a vertical pin, such as a bolt or stud, fixed to the door and received and pivotally secured within the bracket. For such vehicles, a door is typically removed from the vehicle by opening the door and disconnecting any electrical wiring, bolts, braces, straps, or other components securing the door to the body of the vehicle. For example, it may be necessary to remove a nut located at a distal end of the bolt that secures the bolt within the bracket. These steps are merely exemplary and may be specific to individual vehicles. Factory instructions should be followed for disconnecting and/or decoupling any such components from the door.

In a nonlimiting example of its use, the door lift apparatus 10 is positioned under the open door such that lower portions of the door are received within and supported by the cradle 50. More specifically, the door is received within the cradle sections 52 such that the door spans therebetween, rests on the bottom members thereof, and is supported by both cradle sections 52 simultaneously. Once the door has been decoupled from the body of the vehicle, the displacement device 30 is used to raise the cradle 50 relative to the support frame 12, and thereby raise the door relative to the body of the vehicle. After the door has been sufficiently raised such that the pin is free from the bracket, the door lift apparatus 10 with the door supported thereon is moved away from the vehicle on the wheels 26. The arms of the cradle sections 52 are configured to provide lateral support for the door when removed from the vehicle, and may be considered part of the twin lateral load support system. The door is removed from the cradle 50 and stored, for example on a door storage apparatus as described hereinafter. This method may be repeated to remove the other doors of the vehicle.

The door removal method described above may also be reversed to install a door. As a nonlimiting example, a door can be located on the cradle 50 such that the door is supported by the cradle 50, and the cradle 50 is sufficiently raised such that the pin of the door is located above an elevation of the bracket of the vehicle. The door lift apparatus 10 with the door supported thereon is moved toward the vehicle on the wheels 26 and positioned adjacent the vehicle such that the pin is vertically aligned with and above the opening of the bracket. The displacement device 30 is operated to lower the cradle 50 relative to the support frame 12 such that the pin is lowered into and received within the bracket.

Once the pin has been fully received within the bracket, any electrical wiring, bolts, braces, straps, or other components configured to secure the door to the body of the vehicle may be reconnected, preferably in accordance with manufacturer's instructions. For example, it may be necessary to secure the pin within the bracket by threadedly coupling a nut on the distal end of the bolt. The door lift apparatus 10 can then be moved to release the door from the cradle 50. This method may be repeated to replace the other doors of the vehicle.

The support frame 12, cradle 50, and displacement device 30 may have various shapes, sizes, and components. For example, nonlimiting examples of devices suitable for use as the displacement device 30 include various types of jacks such as but not limited to mechanical jacks operated with a hand crank, electrical jacks operated with an electric motor, hydraulic jacks with a hydraulic circuit that may be operated manually or with an electric motor, or pneumatic jacks operated with compressed air. The frame may also take various shapes capable of satisfactorily supporting the displacement device 30 and cradle 50 when carrying a door therein and being moved, for example by rolling on the wheels 26, across a support surface, such as a floor. For example, the support frame 12 could have the form of an enclosed cabinet or of a different frame assembly.

FIGS. 4-7 show another nonlimiting embodiment of the door lift apparatus 10 including a support frame 12, a displacement device 30, and a cradle 50, generally as described above, but with the following modifications. The same reference numbers are used for the same features previously described with respect to the embodiment of FIGS. 1-3 and the same descriptions thereof apply equally to the embodiment of FIGS. 4-7 and will not be repeated here for brevity, but reference is made to the previous descriptions. In the embodiment of FIGS. 4-7, the support frame 12 and the displacement device 30 are substantially the same as previously described. The cradle 50, however, has a slightly different embodiment as described hereinafter.

The cradle 50 is represented as including a saddle plate 60 coupled to the top of the displacement device 30 and four arms 62 extending upwardly from the saddle plate 60, which together define two cradle sections 52, each having a generally U-shape formed by a pair of arms and the interconnecting portion of the saddle plate 60. The saddle plate 60 preferably has generally flat rectangular shape. The saddle plate 60 is preferably disposed substantially horizontally level on the top of the displacement device 30, orthogonal to the vertical direction of travel of the displacement device 30, when the wheels 26 of the wheel assemblies 24 are disposed on a horizontal floor. Each of the four arms 62 extends upwardly from a respective corner area of the saddle plate 60 and is spaced apart from the adjacent arms 62 a distance sufficient to receive the thickness of an upright door oriented generally vertically therebetween and still prevent the door from tilting excessively away from the vertical. For example, in certain embodiments, each arm 62 is disposed at a corner of the saddle plate 60 and spaced apart from the adjacent arm along each adjacent side of the saddle plate approximately 12 inches (30 cm), however, other distances may be used. In this way, the saddle plate 60 allows the arms 62 to form four U-shaped cradle sections (instead of only 2 such U-shaped cradle sections as in the previous embodiment), one U-shaped cradle section being formed between each adjacent pair of arms 62 along each of the four sides of the saddle plate 60. This allows, if desired, the door lift apparatus 10 to be arranged to support a door along either of two orthogonal axes, rather than only along a single axis.

As best seen in FIG. 5 and similarly as with the previous embodiment, the door lift apparatus 10 may include lateral load stabilizers, such as the twin lateral load stabilizer system, as described previously. Cradle guide members 56 carried by and disposed on opposite sides of the cradle 50 are configured to slidably interact with the respective frame guide members 28 to prevent or at least limit lateral movement of the cradle 50 relative to the base while allowing the cradle to raise and/or lower relative to the base. In FIG. 5, each cradle guide member 56 is represented as an elongate tube coupled to and extending downwardly from the saddle plate 60 (or a support member portion of the saddle plate 60) on opposite sides of the displacement device 30. The cradle guide members 56 are configured to travel up and down along respective ones of the frame guide members 28 and prevent or at least limit lateral movement of the cradle 50 relative to the base. In FIG. 5, the cradle guide members 56 are represented as received within interior cavities of the respective ones of the frame guide members 28. However, other slidable inter-engagement embodiments between the cradle guide members 56 and the respective frame guide members 28 may be used. For example, in some embodiments the frame guide members 28 may be receivable within the cradle guide members 56.

Figure 6:
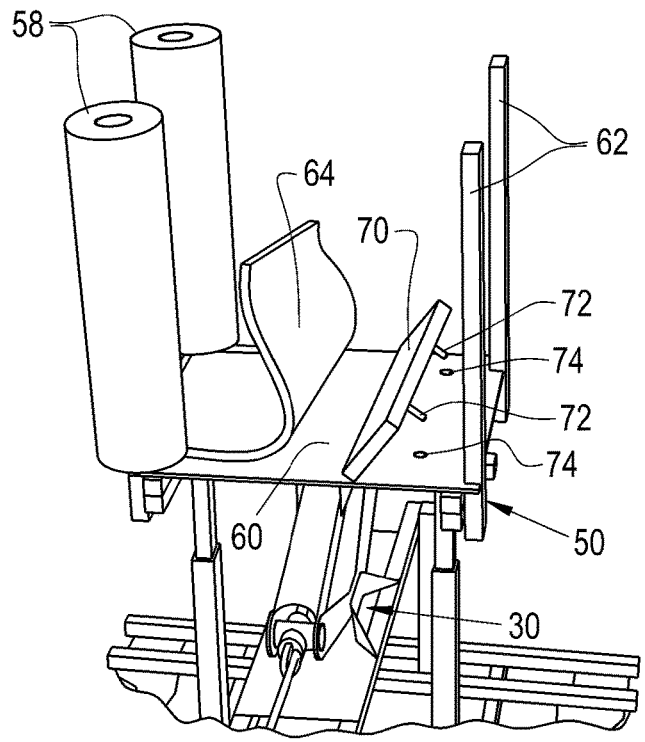
FIG. 6 is an enlarged partial perspective view of the door lift apparatus of FIG. 4 and illustrates the optional installation of a leveling shim according to certain nonlimiting aspects of the invention.
Figure 7:
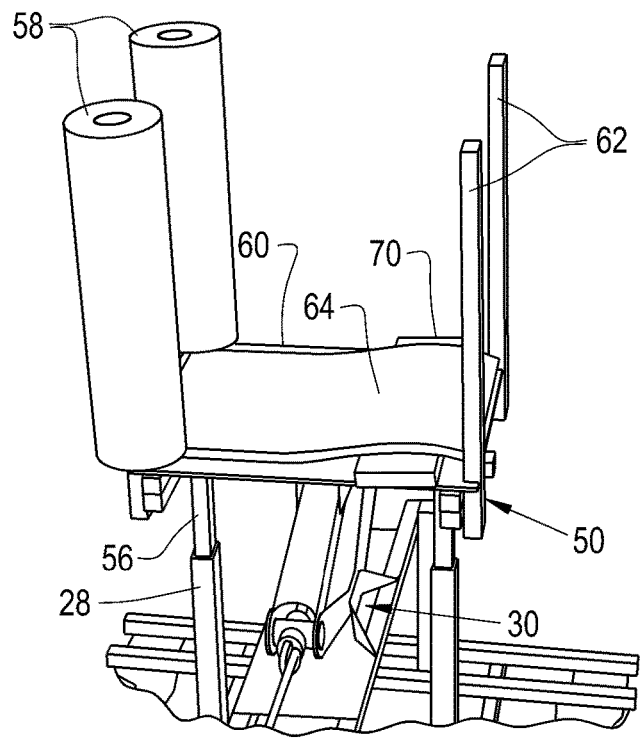
FIG. 7 is an enlarged partial perspective view of the door lift apparatus with the shim of FIG. 6 in an operative position for leveling a door supported in the cradle.

A cushion 64 is optionally disposed on a top surface of the saddle plate 60 extending laterally (horizontally) between the four arms 62 to cushion and prevent scratching or denting of the bottom edge of a door when supported within the cradle 50. The cushion 64 may be, for example, a layer of foam rubber, silicon rubber, cloth, or other soft material. In FIGS. 6 and 7, the cushion 64 is represented as a flexible mat formed of a sheet of rubber (or similar cushiony rubber-like material) that lays on the top surface of the saddle plate 60. The cushion 64 may include a plurality of deformable protrusions, such as nibs, bumps, or fingers, extending upwardly from its top surface to provide additional cushioning and/or traction to prevent slipping of a door supported thereon. Preferably, the cushion 64 is not completely fixedly secured to the entire top surface of the saddle plate 60 so that it may be selectively peeled away and/or removed. For reasons described hereinafter, the cushion 64 preferably can be simply removed from and subsequently reinstalled on the top surface of the saddle plate 60.

Turning now to FIGS. 6 and 7, a leveling shim 70 may optionally be removably coupled to the saddle plate 60 to provide an optional leveling device for use, for example, in maintaining a door with a slanted bottom edge in a level orientation when carried on the saddle plate 60 of the cradle 50. The leveling shim 70 may take various shapes. In the embodiment represented in FIGS. 6 and 7, the shim has an elongate trapezoidal shape having a length, width, and height so as to extend generally across one side of the top surface of the saddle plate 60 and form a step or other elevation difference from the other side of the top surface of the saddle plate 60. Other selected shapes for the leveling shim 70 suitable for supporting a door in the cradle 50 in a preselected orientation may also be used.

Preferably, the leveling shim 70 locks into a pre-selected operational position on the saddle plate 60. To accomplish this, one or more lock features on the saddle plate 60 may lockingly engage with a respective one or more locking features on the leveling shim 70 to hold the leveling shim in the pre-selected operative position. For example, in the embodiment represented in FIGS. 6 and 7, first and second key projections 72, such as short fingers or posts, extend downwardly from the bottom surface of the leveling shim 70 and can be slidably inserted into corresponding key holes 74 in the top surface of the saddle plate 60. This arrangement ensures proper placement of the leveling shim 70 in the operative position and prevents the leveling shim from sliding along the top surface of the saddle plate 60 out of the operative position.

The leveling shim 70 may be inserted by lifting the cushion 64 from the top surface of the saddle plate 60 to expose the shim receiving area and the key holes 74. The leveling shim 70 is then placed in the operative position on the top surface of the saddle plate 60, for example by placing the key projections 72 into the respective key holes 74. With the leveling shim 70 in the operative position, the cushion 64 is capable of being re-laid over the top of the leveling shim 70 (as well as the rest of the top surface of the saddle plate 60. Thus, as best seen in FIG. 7, the leveling shim 70 forms a step to a raised area above the rest of the top surface of the saddle plate 60, and the cushion 64 lays over and generally follows the contours of the leveling shim 70 and the rest of the top surface of the saddle plate 60.

Preferably, the leveling shim 70 and the saddle plate 60 are configured so that the leveling shim may be used when removing and/or installing a door from either side of the vehicle. In this instance, the saddle plate 60 is represented as including a pair of key holes 74 adjacent opposite edges of the saddle plate 60. Each pair of key holes 74 is configured to receive the key projections 72 of the leveling shim 70. This way, the leveling shim can be securely and removably mounted along either edge of the saddle plate 60, which allows the door lift apparatus 10 to be used with the leveling shim 70 on both the right and left sides of the vehicle, depending on which edge of the saddle plate 60 the leveling shim 70 is mounted.

In FIGS. 6 and 7, it can further be seen that the padding 58 may be in the form of foam tubes that can be selectively slid on to and off of the arms 62. If the cushion 64 extends underneath the foam tubes, the foam tubes may be slid off of one or more of the arms to allow the cushion 64 to be peeled back from the top surface of the saddle plate 60 to allow insertion and/or removal of the leveling shim 70. Thereafter, the foam tubes are slid back on to the arms 62 before placing a door into the cradle 50 to prevent the arms 62 from scratching the door.

Figure 8:
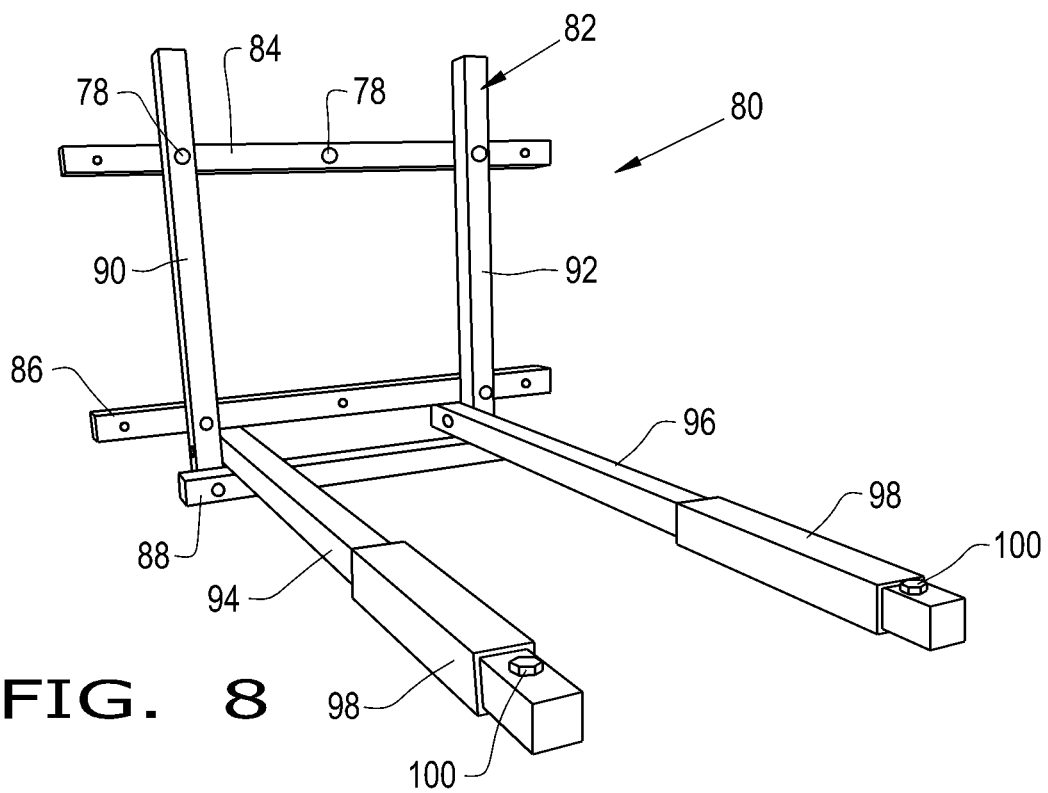
FIG. 8 is a perspective view of a wall-mounted door apparatus in a lowered position for temporarily receiving and hanging a door according to certain nonlimiting aspects of the invention.
Figure 9:
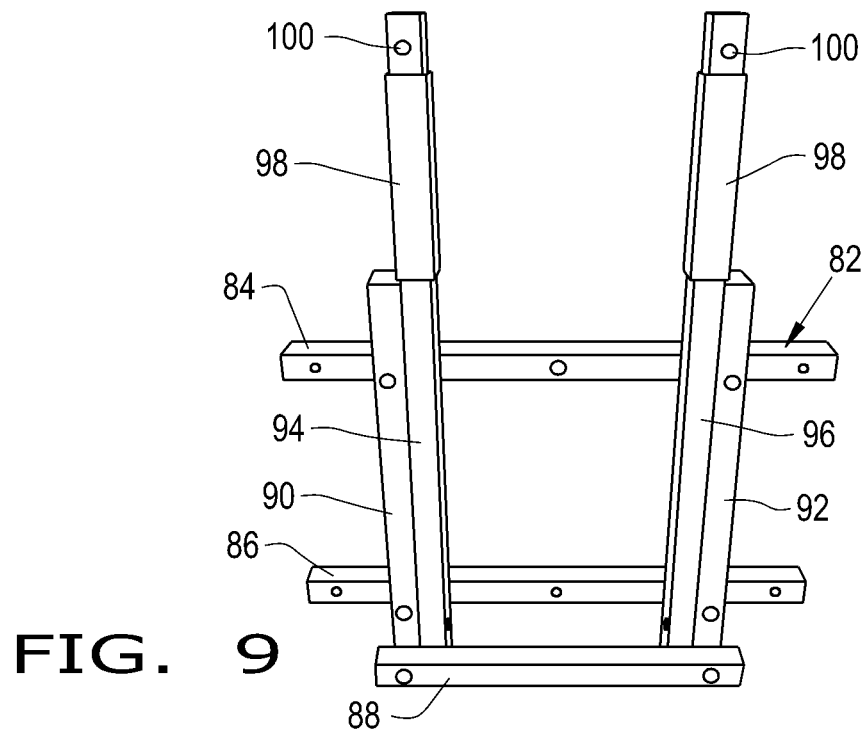
FIG. 9 is a perspective view of the wall-mounted door apparatus of FIG. 8 in a folded-up position for storage without a door received thereon.

FIGS. 8 and 9 show an exemplary door storage apparatus 80 which may be used to store one or more doors of a vehicle, for example, after removing the door(s) from the vehicle with the door lift apparatus 10. The door storage apparatus 80 is represented in FIGS. 8 and 9 as a wall-mounted door rack configured to be mounted to a wall. The door storage apparatus 80 is further represented as including a mounting frame 82 configured to be secured to a wall, for example with screws or bolts 78 extending through the frame into one or more studs in the wall. In the embodiment as represented, the mounting frame 82 is formed of three horizontal tubes, upper and lower wall mount tubes 84 and 86, and an arm stop tube 88 disposed below the lower wall mount tube 86. Left and right vertical tubes 90 and 92 are spaced horizontally apart from each other and coupled to the front sides (opposite the back side facing the wall) of the upper and lower wall mount tubes 84, 86. The tubes 84-92 may be secured together by any sufficient mechanism, such as with screws, bolts, and/or welds, for example. A pair or left and right hanger arms 94 and 96 are rotatably secured to the inner sides of the respective left and right vertical tubes 90 and 92, for example by pins such as bolts or screws. Each hanger arm 94 and 96 can be pivoted about its respective pin between a generally horizontal lowered position (FIG. 8), and a generally vertical raised or folded-up position (FIG. 9). The arm stop tube 88 is arranged to stop the arms 94 and 96 from pivoting below the horizontal position. The arm stop tube 88 is connected to the front sides (away from the wall) of the left and right vertical tubes 90 and 92 and spaced below the bottom edge of the lower wall mount tube a distance approximately equal to the thickness of each of the hanger arms 94 and 96. The hanger arms 94 and 96 may have the same thickness as each of the vertical tubes 90 and 92. In this way, each hanger arm 94 and 96 can pivot up around its respective pin into the folded-up position and when pivoted down into its lowered position, the upper surface of the arm stop tube 88 stops and supports the lower surfaces of the hanger arms 94 and 96, and the top surface of the proximal end of each hanger arm 94 and 96 abuts against and is stopped by the lower surface of the lower wall mount tube 86. Preferably, each hanger arm 94 and 96 is long enough to support two doors from the top lower edge of its window frame in an approximately parallel arrangement, with the first door disposed adjacent the wall near the proximal ends of the hanger arms, and the second door disposed adjacent the first door near the distal ends of the hanger arms.

In embodiments where the door storage apparatus 80 is configured to support two doors, the door storage apparatus 80 may include a dual load slide configured to slide a door back and forth along the lengths of the hanger arms 94 and 96. The dual load slide is represented as including a door glide 98 that is slidably mounted on each of the left and right hanger arms 94 and 96 and configured to slide axially back and forth along the respective hanger arm between the proximal and distal ends thereof. The door glide 98 may be a sleeve that wraps around the hanger arm, such as a length of tubing slightly larger than the outer measurement of the hanger arm. As a nonlimiting example, each door glide 98 may be a length of 1.25 inch (3.1 cm) square tube slidingly disposed on 1 inch (2.5 cm) square tube hanger arms 94 and 96. Each door glide is long enough to set a window frame of a door on, for example approximately 6 inches (15 cm) long. However, other sizes, shapes, and forms of the door glides may be used. Preferably, a glide stop 100 is located near the distal end of each hanger arm 94 and 96 to engage and prevent the door glide 98 from sliding off the distal end of its respective hanger arm. The door glides 98 are adapted to slide a door back and forth between the distal and proximal ends of the hanger arms 94 and 96 without scraping the bottom edge of the window frame along the top surface of the hanger arms. 94 and 96. For example, when placing a first door to be hung onto the hanger arms 94 and 96 when in the lowered position, the glide stops 100 may be disposed at the distal ends of the hanger arms 94 and 96. The bottom edge of the door upper window frame may then be lowered onto the glide stops 100, and the door pushed toward the proximal ends of the hanger arms 94 and 96 by sliding the door glides 98 toward the wall. Subsequently, a second door may be hung on the distal ends of the hanger arms 94 and 96 in front of the first door. In such embodiments, the door storage apparatus 80 can accommodate and carry two doors, such as two front doors, two back doors, or a front door and a back door.

Figure 10:
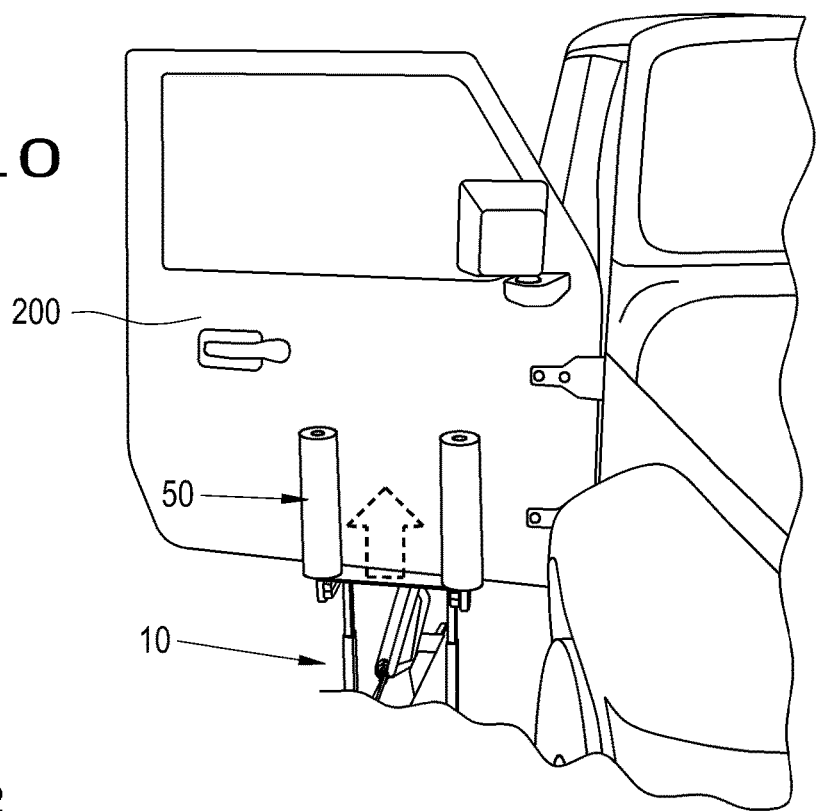
FIG. 10 illustrates a step in removing a door from a vehicle using the door lift apparatus of FIG. 4 according to a nonlimiting aspect of the invention.
Figure 11:
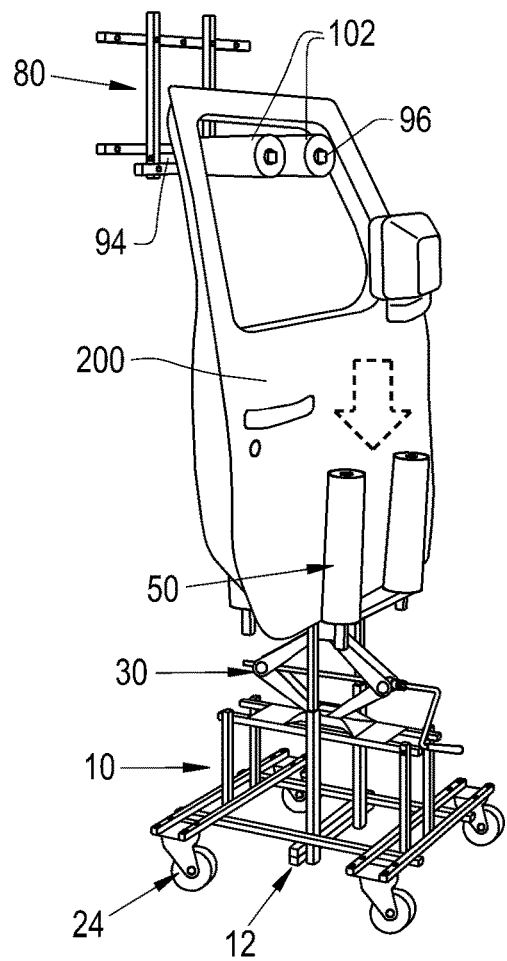
FIG. 11 illustrates a step in hanging a removed door on the wall-mounted door apparatus of FIG. 8 using the door lift apparatus of FIG. 4.

FIGS. 10 and 11 show how the door lift apparatus 10 and the door storage apparatus 80 may be used together to remove, store, and/or install a door 200 from a vehicle frame. FIG. 10 shows the door lift apparatus 10 being used to remove the door 200 from the vehicle frame by raising the door 200 from its hinge(s) to the door frame (as indicated by the dashed arrow in FIG. 10). This process is essentially the same as described previously herein, and reference is made the previous description. Once separated from the vehicle frame with the door lift apparatus 10, the door lift apparatus 10 is moved near to the door storage apparatus 80, for example, by rolling the wheels 26 across the floor. Once in front of the door storage apparatus 80, the displacement device 30 is lifted to position the bottom edge of the top window frame of the door 200 slightly above the lowered hanger arms 94 and 96 of the door storage apparatus 80. The door lift apparatus 10 is then moved toward the wall until the top window frame of the door 200 is positioned above the door glides 98 at the distal end of the hanger arms 94 and 96, with the hanger arms 94 and 96 extending through the door window frame with the window glass rolled down. Then, the displacement device 30 is lowered (as indicated by the dashed arrow in FIG. 11) until the bottom edge of the door top window frame is resting on the top surfaces of the door glides 98. The door lift apparatus 10 is then slid sideways out from underneath the door 200, and the door 200 is shifted toward the wall by sliding the door glides 98 toward the proximal ends of the hanger arms 94 and 96. Thereafter, a second door may be removed from the vehicle frame and hung on the distal ends of the hanger arms 94 and 96 in a similar manner. When it is desired to reinstall the door(s) on the vehicle frame, the process can be reversed.

As best seen in FIG. 11, padding 102 generally similar to the padding 52 may be provided to cover the door glides 98 and/or the hanger arms 94 and 96 to prevent scratching the door window frame. The padding 102 is represented in FIG. 11 as a foam tube that fits around a door glide 98 and/or hanger arm 94 and 96. The foam tube may be adapted to selectively slide on and/or off the door glide 98 and or the hanger arm 94 and 96. If desired, two sets of padding 102 may be provided, one set for each of two doors. As seen in FIG. 11, the second set of padding 102 may be stored on other tubes of the door storage apparatus 80, such on the top ends of the left and right vertical tubes 90 and 92, for example, until they are needed on the hanger arms 94 and 96. The first set may be slid onto the door glides 98 and the second set may be slid onto the distal ends of the hanger arms 94 and 96 after the door glides have been slid toward the wall. Other types and/or forms of the padding 102 may be used.

While the door lift apparatus 10 and the door storage apparatus 80 have been described in terms of specific or particular embodiments, alternatives could be adopted by one skilled in the art. For example, the door lift apparatus 10 and/or the door storage apparatus 80 and their components could differ in appearance and construction from the embodiments described herein and shown in the figures, functions of certain components of the door lift apparatus 10 and/or the door storage apparatus 80 could be performed by components of different construction but capable of a similar (though not necessarily equivalent) function, and various materials could be used in the fabrication of the door lift apparatus 10 and/or the door storage apparatus 80 and/or their components. The door lift apparatus 10 and the door storage apparatus 80 may be used for doors of vehicles other than the exemplary vehicles described. Accordingly, it should be understood that the invention is not necessarily limited to any embodiment described herein. It should also be understood that the phraseology and terminology employed above are for the purpose of describing the disclosed embodiment, and do not necessarily serve as limitations to the scope of the invention.

The invention claimed is:

1. A door lift apparatus for assisting in the removal of a single door at a time from a vehicle, the door lift apparatus comprising:
   a support frame configured to support the door lift apparatus on a surface;
   a cradle configured to receive and hold at least lower portions of the door over the support frame with the door centered on the cradle and configured to maintain the door in an upright orientation;
   a displacement device coupling the support frame to the cradle and configured to raise and lower the cradle relative to the support frame, the displacement device comprising a mechanical scissor jack having a foot coupled to the support frame, a bracket coupled to the cradle, a pair of lower arms pivotally coupled to the foot, a pair of upper arms pivotally coupled to the bracket and to the pair of lower arms, a screw threadedly coupled with the pair of lower arms and with the pair of upper arms, and a handle coupled to the screw and operable to lower and raise the cradle relative to the support frame with the screw; and
   transport means coupled to the support frame for enabling movement of the door lift apparatus across the surface.

2. The door lift apparatus of claim 1, wherein the cradle includes a first cradle section and a second cradle section, wherein each cradle section has a U-shaped body comprising a pair of arms extending upwardly from a base section, wherein the U-shaped body is configured to receive the at least lower portions of the door while the door is coupled to the vehicle.

3. A door lift apparatus for assisting in the removal of a door from a vehicle, the door lift apparatus comprising:
   a support frame configured to support the door lift apparatus on a surface;
   a cradle configured to receive and hold at least lower portions of the door over the support frame with the door centered on the cradle and configured to maintain the door in an upright orientation;
   a displacement device coupling the support frame to the cradle and configured to raise and lower the cradle relative to the support frame;
   transport means coupled to the support frame for enabling movement of the door lift apparatus across the surface; and
   a lateral stabilizer configured to stabilize the cradle, the lateral stabilizer comprising:
      a frame guide member fixed to the support frame; and
      a cradle guide member fixed to the cradle;
   wherein the cradle guide member slides along the frame guide member as the cradle is raised and lowered with the displacement device,
   wherein the frame guide member provides a lateral barrier to guide the cradle guide member, and
   wherein the cradle guide member and the frame guide member in combination provide lateral support to the cradle.

4. The door lift apparatus of claim 3, wherein the frame guide member has a longitudinal cavity, wherein the cradle guide member is slidably received within the longitudinal cavity of the frame guide member, and wherein the cradle guide member slides within the longitudinal cavity of the frame guide member as the cradle is raised and lowered with the displacement device.

5. The door lift apparatus of claim 3, further comprising a second lateral stabilizer configured to stabilize the cradle, the second lateral stabilizer comprising:
   a second frame guide member fixed to the support frame on an opposite side of the displacement device as the first said frame guide member; and
   a second cradle guide member fixed to the cradle on an opposite side of the displacement device as the second said cradle guide member;
   wherein the second cradle guide member slides along the second frame guide member as the cradle is raised and lowered with the displacement device,
   wherein the second frame guide member provides a lateral barrier to guide the second cradle guide member, and
   wherein the second cradle guide member and the second frame guide member in combination provide lateral support to the cradle.

6. The door lift apparatus of claim 1, wherein the transport means comprises a wheel assembly.

7. A door lift apparatus for assisting in the removal of a door from a vehicle, the door lift apparatus comprising:
   a support frame configured to support the door lift apparatus on a surface;
   a cradle configured to receive and hold at least lower portions of the door over the support frame with the door centered on the cradle and configured to maintain the door in an upright orientation;
   a displacement device coupling the support frame to the cradle and configured to raise and lower the cradle relative to the support frame; and
   transport means coupled to the support frame for enabling movement of the door lift apparatus across the surface;
   wherein the cradle comprises a saddle plate carried by the displacement device, a first pair of arms extending upwardly from the saddle plate on opposite lateral sides of the saddle plate, and a second pair of arms extending upwardly from the saddle plate on opposite lateral sides of the saddle plate, wherein each of the first and second pair of arms is spaced apart a distance configured to receive a door thickness therebetween with a bottom edge of the door supported by the saddle plate; and
   wherein a leveling shim is configured to be releasably secured to a top surface of the saddle plate, the leveling shim forming a step or elevation change along the top surface of the saddle plate configured to engage a contoured portion of the bottom edge of the door and maintain the door in a substantially level position when supported by the saddle plate.

8. The door lift apparatus of claim 7, wherein the leveling shim releasably locks into a pre-selected operational position on the saddle plate.

9. The door lift apparatus of claim 8, wherein the leveling shim releasably locks into second pre-selected operational position on the saddle plate, wherein the first said pre-selected operational position is disposed adjacent a first lateral side of the saddle plate, and the second pre-selected operational position is disposed adjacent a second lateral side of the saddle opposite the first lateral side.

10. A method of removing of a door from a vehicle, the method comprising:
    opening the door of the vehicle;
    positioning a door lift apparatus under the door such that at least lower portions of the door are received within and supported by a cradle of the door lift apparatus;
    raising the cradle relative to a support frame of the door lift apparatus with a displacement device that couples the cradle to the support frame and thereby raising the door relative to a body of the vehicle with the cradle;
    continuing to raise the cradle with the displacement device until the door has been sufficiently raised such that the door is decoupled from a door hinge of the vehicle;
    moving the door lift apparatus with the door supported thereon away from the vehicle on transport means coupled to the support frame of the door lift apparatus after the door has been decoupled from the door hinge;
    moving the door lift apparatus with the door supported thereon to a door storage apparatus comprising a hanger arm extending generally horizontally;
    adjusting the height of the door with the displacement device so that the hanger arm is aligned with a window opening of the door;
    moving the door lift apparatus such that the hanger arm extends through the window opening; and
    lowering the displacement device until a top window frame of the door is supported by the hanger arm.

11. The method of claim 10, wherein the door storage apparatus further comprises a door glide slidably carried by the hanger arm, and wherein lowering the displacement device includes lowering the top window frame onto the door glide; and further comprising:
    sliding the door axially along the hanger arm on the door glide.

12. The method of claim 10, wherein the at least lower portions of the door are received within spaced apart cradle sections of the cradle such that the door spans therebetween, and such that the door is supported by the cradle sections simultaneously.

13. The method of claim 10, wherein the door hinge includes an assembly of a bracket fixed to the body of the vehicle and a pin fixed to the door that is received and pivotally secured within an opening of the bracket, wherein decoupling the door from the door hinge includes raising the door a sufficient distance such that the pin is removed from the bracket.

14. The method of claim 10, further comprising replacing the door by:
- locating the door on the cradle such that the door is supported by the cradle;
- positioning the door adjacent the bracket of the vehicle with the door lift apparatus;
- lowering the cradle relative to a frame of the door lift apparatus with the displacement device and thereby lowering the door relative to a body of the vehicle with the cradle; and
- continuing to lower the cradle until the door is coupled with the door hinge of the vehicle.

15. The method of claim 14, wherein the door hinge includes an assembly of a bracket fixed to the body of the vehicle and a pin fixed to the door that is received and pivotally secured within an opening of the bracket, wherein positioning the door adjacent the bracket includes raising the cradle such that the pin is located above an elevation of the bracket and aligning the pin with and above the opening of the bracket, wherein the door has been sufficiently lowered when the pin is lowered into and fully received within the bracket.

* * * * *